June 21, 1927.
C. W. DAUGHS
1,632,952
METHOD AND APPARATUS FOR HANDLING LUMBER
Filed Nov. 3, 1923 2 Sheets—Sheet 1
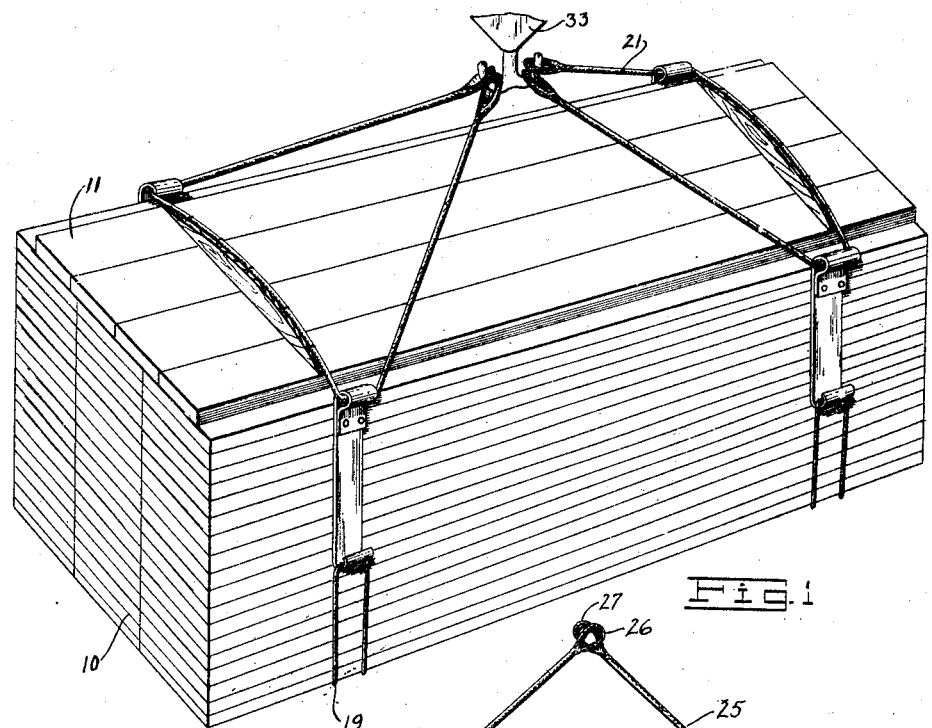
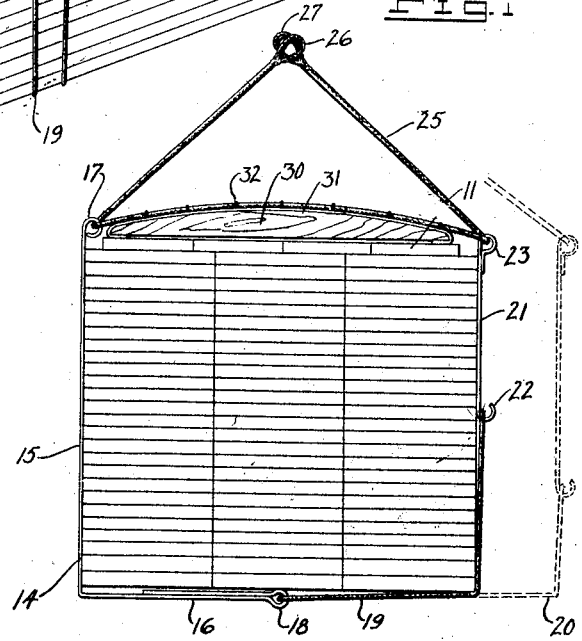
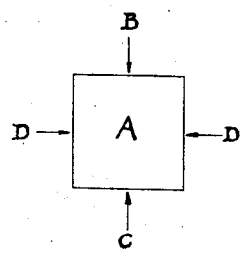
INVENTOR.
C. W. DAUGHS
BY
B. J. Craig
ATTORNEY June 21, 1927.
C. W. DAUGHS
1,632,952
METHOD AND APPARATUS FOR HANDLING LUMBER
Filed Nov. 3, 1923     2 Sheets-Sheet 2
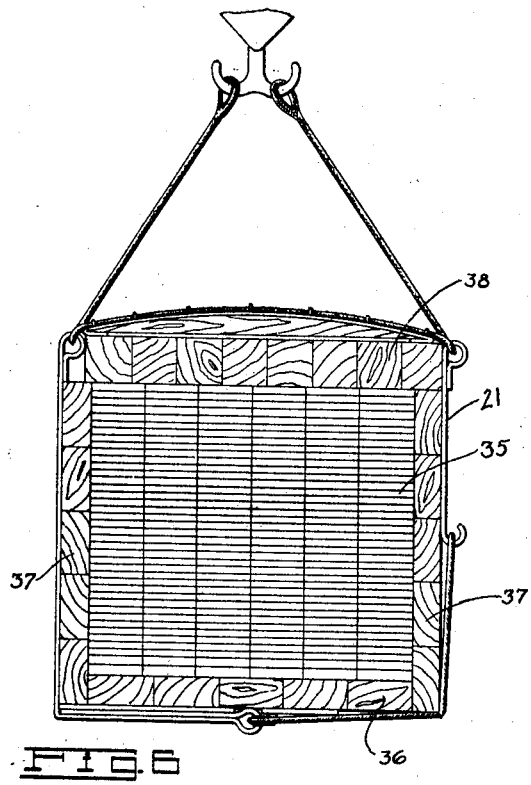
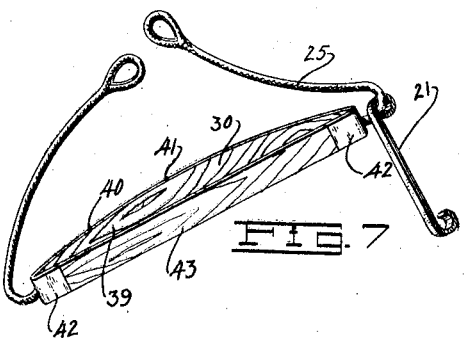
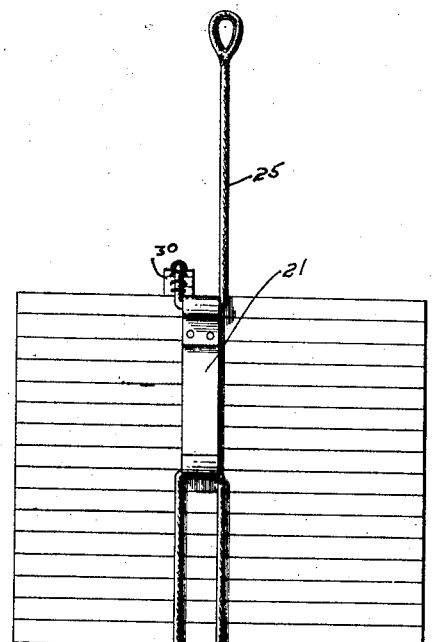
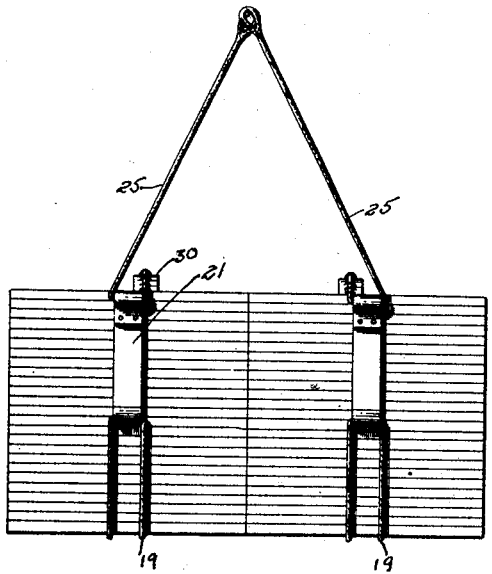
INVENTOR.
C. W. DAUGHS
BY B. J. Craig
ATTORNEY.

Patented June 21, 1927.

1,632,952

UNITED STATES PATENT OFFICE.

CHARLES W. DAUGHS, OF ALAMEDA, CALIFORNIA, ASSIGNOR TO DAUGHS SHIP CRANE COMPANY, A CORPORATION OF OREGON.

METHOD AND APPARATUS FOR HANDLING LUMBER.

Application filed November 3, 1923. Serial No. 672,668.

This invention relates to means and a method for transporting bulk material.

The general object of the invention is to provide an improved method and means for handling and transporting lumber.

One of the specific objects of the invention is to provide a novel arrangement for handling lumber whereby a plurality of planks of equal length may be secured together, loaded as a package into a vessel, transported and then unloaded in the package form.

A further object of the invention is to provide an improved securing means for holding together and lifting a plurality of individual units.

An additional object of the invention is to provide an improved type of brace member for rigidly securing together a package comprising a plurality of units.

An additional object of the invention is to provide a holder for securing a plurality of elongated units together while being moved, said holder including means for exerting inward pressure against the four sides of the unit.

Other objects of the invention will be apparent from the following description taken in connection with the accompanying drawings wherein Fig. 1 is a perspective view of a package embodying the features of my invention; Fig. 2 is an end view of my improved package; Fig. 3 is a diagram showing the forces set up in my package; Fig. 4 is a side elevation of a single package; Fig. 5 is a side elevation of a twin package; Fig. 6 is an end view showing my package adapted for use with finished products and Fig. 7 is a perspective of a tie member and truss.

Referring to the drawing by reference characters, I have shown a pile of lumber at 10. Although I describe my invention in connection with the handling of lumber it will be understood that it is equally well adapted for other uses. As here shown the lumber comprises a plurality of boards of uniform length, breadth, and thickness. My invention is particularly adapted for handling uniform lengths of lumber in individual packages and although I have shown the boards comprising the package in Fig. 1, as of uniform width and thickness, it is to be understood that the boards of each package may vary in width and thickness but it is desirable that the entire package present a rectangular outline when completed. Across the tops of the boards I show narrower boards 11 which serve to form the top portion of my improved package.

In order to hold the individual boards together, I show a binder comprising an $L_5$ shaped frame member 14 which includes a vertical leg 15 and the horizontal leg 16. The member 14 is preferably constructed as a metal strap which is preferably rigid so that it will be self supporting after a few planks are placed thereon. The member 14 is shown as provided with an eye 17 at the top and with the second eye 18 adjacent the bottom thereof. Secured to the eye 18 I show a connecting loop 19 which is preferably constructed from a flexible metal cable. The loop 19 being flexible is adapted to be bent to conform to the width of the package with which it is used. In dotted lines in Fig. 2 I show at 20 the loop bent to surround material wider than that shown in full lines.

A coupling member is shown at 21. The coupling member is provided with a hook 22 at the lower end and with an eye 23 at the top. The hook 22 is adapted to engage the loop 19. The member 21 should be of sufficient height so that the eye 23 will be disposed substantially in the same horizontal plane as the eye 17. In using my improved packaging means I prefer to have on hand a plurality of members 21 of various lengths so that one of the proper dimensions will be always available for use.

In order to complete my package I show the coupling member as having a sling 25 thereon. The sling preferably comprises a flexible metal cable having a grommet 26 and 27 at each end thereof. The sling 25 is provided intermediate its ends with a truss member 30. The truss member 30 preferably comprises a rigid wooden strip having an arched top portion 21 to which the sling 25 is shown as secured by fastening members 32.

In making up my package the member 30 is placed upon the top planks 11. The hook 22 is then slipped into the loop 19 and the grommet 26 is threaded through the eye 17. The grommets 26 and 27 are then placed on a hook 33 secured to a lifting tackle. After the package is placed in the transporting means which may be a ship, a truck, or a freight car, the sling 25 with its attached connecting member 21 is removed from the package so that the only parts which go with the package are the members 15 and 19.

In Fig. 1 of the drawings I show the use of two binders with the two slings 25 passing to the lifting device 33. In Fig. 4 of the drawings I show the use of but one binder for lifting a package of lumber. I have found that in handling packages up to twelve feet in length that one binder arranged in the center of the package is sufficient. Where the lumber is more than twelve feet in length, I have found it desirable to use the arrangement shown in Fig. 1. It is sometimes desirable to arrange two separate packages side by side as shown in Fig. 5 and to lift the two packages as a unit.

The package heretofore described is particularly adapted for the handling of unfinished material. When I desire to transport finished material such as flooring, etc., I may provide a package as shown in Fig. 6 wherein the package comprises a plurality of rectangular pieces such as flooring of substantially uniform length and shown at 35. These pieces are laid upon unfinished lumber as at 36 while across the sides of the package I show other pieces of rough lumber 37 and at the top I may employ more of the rough pieces 38. The result of this last described package is that the binder causes the rough material to completely protect the finished material within the package.

The truss member 30 which is shown in detail in Fig. 7 preferably comprises a wooden portion 39 which has a metal strap 40 passing around the curved portion 41 thereof and having the ends 42 of the metal portion bent upon the underside of the truss member. A thin plank 43 may be arranged between the ends 42 of the metal strap so that the under surface of the truss 30 will be plane.

In Fig. 3 I have shown, diagrammatically, the action of forces present when my package is being lifted. The package is shown at A. The lifting action due to the truss 30 causes a downward pressure as indicated by the arrow B while the weight of the package causes an upward binding action as at C, and the lateral pull on the members 15 and 21 causes an inward pressure as shown by the arrows D.

From the foregoing description it will be apparent that I have provided an improved method and means for handling lumber which makes for economical transportation, which is simple in operation, and which is inexpensive to install.

Having thus described my invention, I claim:

1. A packing device comprising a rigid member including a base portion and a vertically extending portion, a flexible member secured to said rigid member at one end thereof, said flexible member having a part thereof adapted to be arranged parallel to the base portion and another part adapted to be arranged parallel with the vertical portion when the device is in use, a lifting sling attached to the vertically extending portion, said sling including a transversely extending member, a coupling member on said sling, said coupling member including an eye for engaging said flexible member.

2. The method of conveying pieces of elongated material to their destination by a plurality of transporting means comprising the steps of piling the pieces upon a partly rigid and partly flexible support, securing a binding and transporting sling to said support to cooperate therewith to form said pieces into a bundle, transporting said bundle to a carrier, stowing said bundle on said carrier, removing the sling from the support, transporting said bundle while stowed, replacing the binding and transporting sling in its cooperative binding relation with the support and the bundle, transporting said bundle to its destination from the carrier, and removing the sling and support, thereby depositing the pieces.

3. A package comprising a plurality of rectangular articles of uniform length, a binder about said articles, said binder comprising members arranged on the bottom and two sides of the package and a sling engaging said members, said sling including a flexible member extending across the top of the package from one edge of the package to the other, and adapted to hold said package in a rectangular shape and means whereby when said package is lifted downward inward pressure is exerted across the top of the package.

4. A package comprising a plurality of rectangular articles of substantially equal length, means to secure said articles together, said means including a base member having two upright portions extending therefrom, one of said upright portions being flexible, and the other rigid, lifting means secured to the ends of said upright portions and a member extending across the top of said package.

5. A package comprising a plurality of rectangular articles of substantially uniform length, a binder for securing said articles in package form, said binder comprising a base portion and two side portions, a rigid top member extending transversely across the package, said top member having a flexible member mounted thereon comprising a sling, and means to connect the flexible member to each of the said side portions.

6. A device for handling a package of lumber comprising a binder including a bottom and a pair of side portions, a cross member extending transversely across the top of the package, a sling arranged on said cross member, said sling being secured to said side portions, and means whereby said sling and said side portions coact to force the cross member in firm engagement with the top of the package.

7. A packing device comprising a rigid member including a base portion and a vertically extending portion, a flexible member secured to said rigid member at one end thereof, and having a part thereof arranged parallel with the base portion and a part parallel with the vertical portion, a lifting sling attached to the vertically extending portion, said sling including a transversely extending member, said transversely extending member having a substantially straight bottom and a crowned top.

8. A device for handling lumber comprising a substantially rigid L-shaped angular member having a base portion and a vertically extending portion with an eye at one end, a flexible cable secured to the base portion and having a part extending parallel to the vertical portion, a connecting member secured to the top of said flexible cable and having an eye thereon, a sling, a truss member on the sling extending between said eyes and having a top portion sloping toward the middle of the sling, said flexible member passing through said eyes and engaging said truss member.

In testimony whereof, I hereunto affix my signature.

CHARLES W. DAUGHS.